United States Patent [19]

Sawatzki et al.

[11] 4,260,347

[45] Apr. 7, 1981

[54] APPARATUS FOR PRODUCING SPACER FRAMES FOR INSULATING GLASS WINDOW STRUCTURES

[75] Inventors: Rolf Sawatzki, Marl; Heinz-G. Gubelius, Essen; Joachim Heienbrock, Gladbeck; Friedrich Halberschmidt, Herzogenrath; Josef Audi, Aachen; Norbert Schwarzenberg, Herzogenrath, all of Fed. Rep. of Germany

[73] Assignee: Saint-Gobain Vitrage, Neuilly-sur-Seine, France

[21] Appl. No.: 134,151

[22] Filed: Mar. 25, 1980

[30] Foreign Application Priority Data

Mar. 26, 1979 [DE] Fed. Rep. of Germany ....... 2911831

[51] Int. Cl.$^3$ ........................... B29C 1/00; B29F 1/00

[52] U.S. Cl. ...................................... 425/123; 29/786; 29/787; 164/332; 164/333; 269/41; 269/126; 269/129

[58] Field of Search ........................ 264/261, 263, 259; 425/110, 113, 114, 123, 126, 129 R, 117; 156/500, 245; 29/786, 787; 164/332, 333

[56] References Cited

FOREIGN PATENT DOCUMENTS

| | | | |
|---|---|---|---|
| 2152832 | 4/1973 | Fed. Rep. of Germany ............. | 269/41 |
| 2453198 | 5/1975 | Fed. Rep. of Germany ............. | 269/41 |
| 2413308 | 10/1975 | Fed. Rep. of Germany ............. | 269/41 |
| 2806262 | 8/1979 | Fed. Rep. of Germany ............. | 269/41 |
| 616014 | 6/1978 | U.S.S.R. .................................... | 269/41 |

*Primary Examiner*—W. E. Hoag

*Attorney, Agent, or Firm*—Pennie & Edmonds

[57] ABSTRACT

In the invention, an apparatus is designed for producing spacer frames for insulating glass window structures, made up of lengths of hollow molding joined together by male cornerpieces. Hollows and spaces at the corner joins are sealed or filled by injection of a sealing composition forced in by the use of a female injection head designed to take up a frame corner, and a driver for pushing the frame corner structure into the injection head. There is furthermore a work table for the frame parts in the working position on injection of the compound or sealant, and gripper structures for keeping the hollow molding lengths, forming the corner, in the desired position. At least one of the gripper structures is able to be moved towards the put-in male part of the cornerpiece after the hollow molding part has been gripped.

9 Claims, 1 Drawing Figure

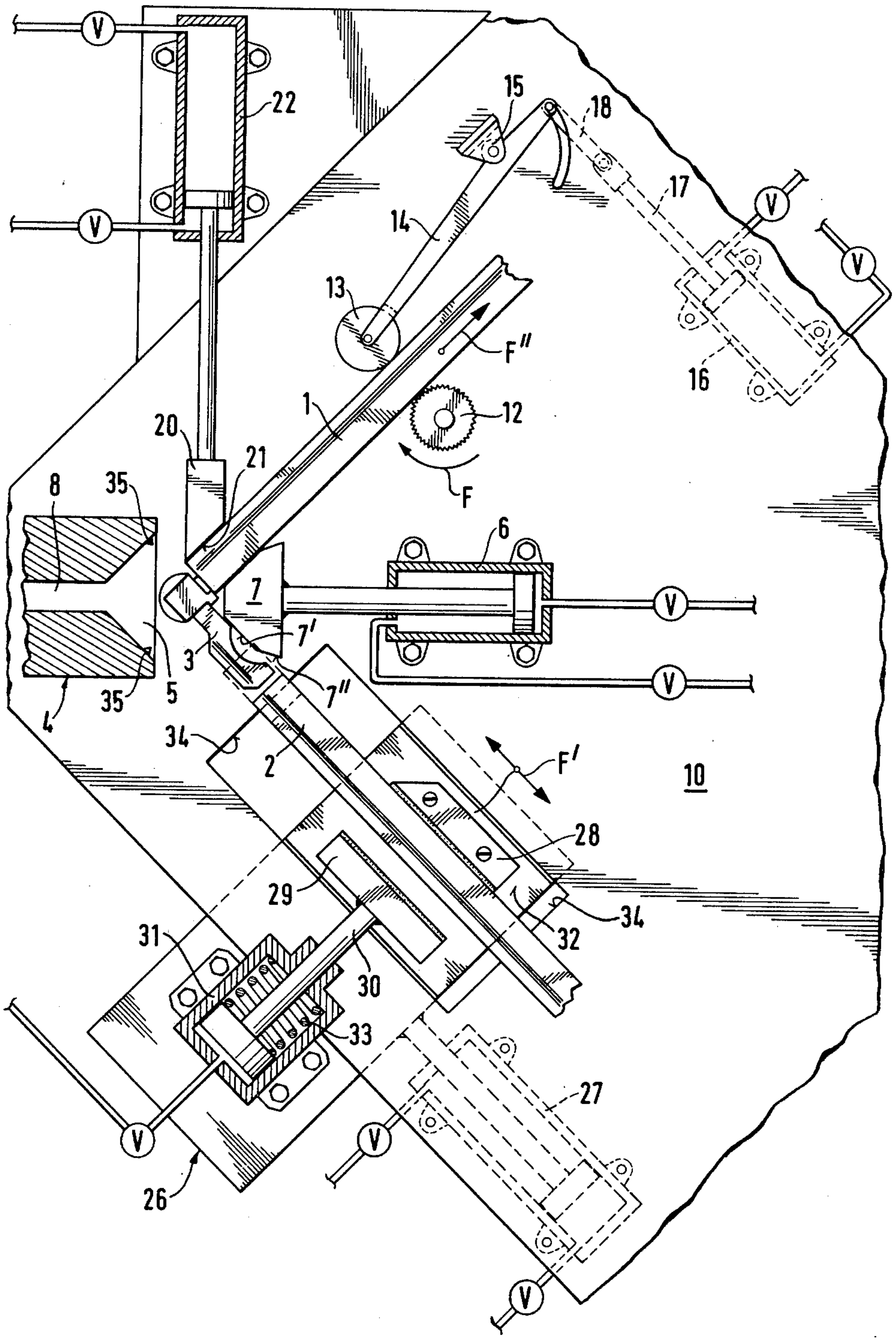
22
15
18
17
14
13
F''
1
12
16
20
21
F
8
35
6
7
7'
3
7''
35
5
4
34
2
F'
10
28
29
34
32
31
30
33
27
26

APPARATUS FOR PRODUCING SPACER FRAMES FOR INSULATING GLASS WINDOW STRUCTURES

BACKGROUND OF THE INVENTION (1) Field of the invention

The present invention is with respect to an apparatus which is designed for producing spacer frames for insulating glass window structures made up of hollow molding parts and inserted male cornerpieces joining the moldings together with the insides of the moldings at the frame corners being sealed by way of an injected sealing compound. The apparatus has an injection head having the form of the frame corners and a system for forcing an assembled frame corner against the injection head.

(2) The prior art

An apparatus of this general sort is to be seen in the German Pat. No. 2,454,192. In this old form of apparatus the hollow molding parts are initially joined by hand with the four cornerpieces for forming the frames and the frame corners are positioned by hand in the injection head. A part of the apparatus for pushing the structure against the injection head has a frame support for the frame corner and has an anglepiece, which is worked by a pressure cylinder for forcing the frame corner into the injection head.

The assembling of the hollow molding parts by slipping the male cornerpieces into the ends of the moldings is slow work and may, more specially, result in misassembly in the case of spacer frames of great size. For this reason, it is an object of the present invention to provide for apparatus producing spacer frames whereby the assembly of the hollow molding parts is made simpler and faster so that the apparatus may generally be worked with less hand labor, more exactly and with a generally quicker working rhythm.

SHORT OUTLINE OF THE INVENTION

For effecting these and other purposes, the apparatus is characterized in the present invention by a work table for supporting the frame parts in the working position on injection of the sealing compound and includes two gripper structures designed to grip the hollow molding parts forming a frame corner. At least one of its gripper structures is adapted to be moved towards a male cornerpiece after the hollow molding part has been gripped by another gripper structure.

Using the present invention, the frame making operation is made very much simpler, this, in turn, being responsible for stepping up the speed of manufacture of the spacer frames so that the price is lower. In the present invention, the male cornerpiece has to be inserted by hand into only one side of the hollow part, while insertion into the other hollow molding part is undertaken automatically with the new apparatus. This insertion operation is combined with the positioning of the frame corner in the injection head so that, to a certain degree, two manufacturing steps are undertaken at the same time by the apparatus of the invention in one single step.

An account will now be given of the invention in connection with a preferred working example, to be seen in the single FIGURE.

DETAILED ACCOUNT OF WORKING EXAMPLE OF THE INVENTION

The single FIGURE is a view, looking downwards towards an apparatus constructed according to the invention and presented without any unnecessary details not important for the invention.

The hollow molding parts 1 and 2 are adapted to be joined together with the help of a male cornerpiece 3 for forming part of a spacer frame. In this respect, the hollow molding parts are joined at any one of the four corners of a right angled spacer frame, that is to say the other three corners may be joined in working steps, undertaken beforehand or afterwards, using male cornerpieces, the hollows between the male cornerpieces and the hollow molding parts being sealed.

For injection of the sealing compound, use is made of the injection head 4, having a female part 5 at the front corresponding in form and size to the frame corner itself. The frame corner is forced by the anglepiece 7, worked by the pressure cylinder 6, against the injection head 4, the sealing composition being then forced through line 8 into the space between the male cornerpiece and the hollow molding parts or lengths. This part of the apparatus is described in full detail in the German Pat. No. 2,454,192.

The injection head 4 and the pressure cylinder 6 are positioned on the work table 10, which is used as a support face for the lengths of hollow molding, that is to say the spacer frame, while it is being produced. Structure is included outside the work support face as may be needed for putting the spacer frame, that is to say the lengths of hollow molding in the necessary position. Thus moving gripper structures for the part 2 of the hollow molding are positioned under the work table, and a gripper structure, made up of the transport roller 12 and the weighted roller 13 is included for gripping the length 1 of hollow molding. The transport roller 12 has a knurled outer face and is rotatably supported on the work support plate so that its axis remains in one position all the time. The transport or driving roller 12 is turned by a motor (not shown) which rotates continuously in the direction F. The weighted roller 13 is placed at the end of a lever 14 which is rotatably supported in a fixed bearing 15. The lever 14 may be turned with the help of a pressure cylinder 16 (placed under the work support face) by way of the piston rod 17 and the lever 18 into two end positions. In this respect, in the end position illustrated, the length or part 1 of hollow molding is forced by the weighted roller 13 against the transport roller 12.

The gripper structure, designed for acting on the length 1 of hollow molding, furthermore has a headpiece 20 having a sloping sliding face 21 at the end, this face adapted to be run up against the side face of the length 1 of hollow molding when acted upon by the pressure cylinder 22. The pressure cylinder 22 is placed, outside the working space needed for positioning the spacer frame, on the work table 10.

The gripper structure which may be moved and is designed for acting on the length 2 of hollow molding, has the movable carriage 26, which, with the help of the pressure cylinder 27 may be moved in the length-direction of the length 2 of hollow molding, that is to say in the direction of the double-headed arrow F'. On the carriage 26 the support jaw 28 is fixedly positioned, while the opposite moving jaw 29, designed for use with it, is placed on the piston rod 30 and is forced by the pressure cylinder 31 to grippingly engage against the length 2 of hollow molding the opposite side of which rests against the jaw 28. The movable carriage 26 is placed under the work table 10, which, for its part, for the range of motion of the jaws 28 and 29, has an opening 34, through which the two jaws 28 and 29 are run so as to be at a higher level than the table's top face. The work table 32 of the carriage 26 is furthermore within the opening 30 and is lined up level with the top of table 10.

Details will now be given of the positions of the tools and other parts of the apparatus at the start of a working operation: The anglepiece 7 is in the pulled-back end position, to be seen in the FIGURE. The transport roller is turned in the direction of arrow F. The lever 14 supporting the weighted roller 13 is turned outwards, the piston in the pressure cylinder 16 being pulled back. The headpiece 20 is in its pulled-back end position and furthermore the moving jaw 29 will be in its pulled-back end position, because of the effect of the spring 33 on it.

With the parts in this starting stage, the length 1 of hollow molding, into whose end the cornerpiece 3 has been inserted by hand beforehand, is placed between the rollers 12 and 13 on the work table 10 in such a way that the inserted connection cornerpiece 3 is run into the opening 5 of the injection head 4. Next, the machine is started, whereupon the separate working steps, under the control of a controlling system, as for example a timing drum, are timed to take place in such a way that firstly the headpiece 20 is pushed forward by the pressure cylinder 22 such that the sliding face 21 engaged against length 1 of hollow molding, pushing it against cornerpiece 7. Next, when the cylinder 16 is now worked, the weighted roller 13 comes up against the length 1 of hollow molding, pushing it against the transport roller 12 so that, acted upon by the knurled outer face of the transport roller 12, the length (or part) of molding is pushed in the direction of arrow F" until the free arm of the cornerpiece 3 comes up against the stop face 7' of the anglepiece 7 and in this position the length 1 of hollow molding, having the male cornerpiece 3, is so positioned that the length 2 of hollow molding may be slipped over the free arm of the male cornerpiece 3.

The machine operator will have since placed length 2 of hllow molding between the jaws 28 and 29, whereupon the moving jaw 29 is moved forwards by the pressure cylinder 31, gripping the length 2 of hollow molding between it and the jaw 28. Now, under the power of the pressure cylinder 27, the length of hollow molding is slipped on to the free end of the cornerpiece 3. The anglepiece 7 has, at a position short of the stop face 7', an inwardly angled guide face 7", that is to say turned inwards in relation to the stop face 7', so that the inner wall of the length 2 of hollow molding may be pushed between the anglepiece 7 and the cornerpiece 3, this operation furthermore being helped along because the force in the pressure cylinder 6 and/or in the pressure cylinder 22 rises to such a level that the anglepiece 7 and/or the headpiece 22 give way.

When the length 2 of hollow molding has been slipped on to the corner piece 3, all tools of the gripper structures go back to their starting positions, this freeing the assembled frame part. Now the pressure cylinder 6 is acted upon for pushing the frame corner into the hollow of the injection head 4, while at the same time the denting teeth 35 take effect for producing a locking, lasting connection between the length of hollow molding and the connection cornerpiece. Nextly, the spaces or hollows between the connection arm and the length of hollow molding are filled with injected material, a full account being given of this operation in the German Pat. Nos. 2,454,192 and 2,462,425.

We claim:

1. An apparatus which is designed for producing spacer frames for insulating glass window structures, made up of hollow molding parts and inserted male cornerpieces joining the moldings together, the insides of the moldings at the frame corners being sealed by way of an injected sealing compound, and has an injection head having the form of the frame corners and a means for forcing a put-together frame corner against the injection head, characterized by:

a work table for the frame parts in the working position on injection of the sealing compound;

and by two gripper structures, designed for use in connection with the hollow molding parts forming a frame corner, at least one of said gripper structures being movable towards the inserted male cornerpiece after the hollow molding part has been gripped.

2. An apparatus as claimed in claim 1, characterized in that the moving carriage is so placed in relation to a top of the work table that a top work support face, used for the one molding part, of the carriage is in line with the top of the work table.

3. An apparatus as claimed in claim 1, characterized in that in the injection head two teeth are present, which, when the frame corner, after being put together, is forced against the injection head, have the effect of stopping any motion out of position of the hollow molding parts and of producing a locking connection of the male cornerpiece in the hollow molding parts.

4. An apparatus as claimed in claim 1, characterized in that gripper structure which is able to be moved has a first gripper jaw fixed to a moving carriage and second a movable gripper jaw worked by a pressure cylinder supported on the moving carriage.

5. An apparatus as claimed in claim 4, characterized by a further pressure cylinder for driving the moving carriage.

6. An apparatus as claimed in claim 4, characterized in that the gripper structure, acting on the other hollow molding part, is fixedly positioned.

7. An apparatus as claimed in claim 5, characterized in that the unmoving gripper structure has a weighted roller placed on a lever, a force-takeup roller fixed opposite to weighted roller, and a headpiece for supporting the end of the hollow molding part.

8. An apparatus as claimed in claim 7, characterized in that the headpiece is moved by a double-acting pressure cylinder.

9. An apparatus as claimed in anyone of claims 1 to 7, characterized in that the headpiece, the weighted roller and the moving jaw are designed to be pulled back into starting positions after joining together of a frame corner.

* * * * *